(12) United States Patent
Marom et al.

(10) Patent No.: US 12,011,778 B2
(45) Date of Patent: Jun. 18, 2024

(54) SYSTEM AND METHOD FOR CONTROLLING OUTPUT OF LIGHT TOWARDS OBJECTS

(71) Applicant: ELBIT SYSTEMS ELECTRO-OPTICS ELOP LTD, Rehovot (IL)

(72) Inventors: Ran Zvi Marom, Rehovot (IL); Ofer Gayer, Rehovot (IL); Rina Cohen, Rehovot (IL)

(73) Assignee: ELBIT SYSTEMS ELECTRO-OPTICS ELOP LTD, Rehovot (IL)

( * ) Notice: Subject to any disclaimer, the term of this patent is extended or adjusted under 35 U.S.C. 154(b) by 0 days.

(21) Appl. No.: 17/686,894

(22) Filed: Mar. 4, 2022

(65) Prior Publication Data
US 2022/0184732 A1 Jun. 16, 2022

Related U.S. Application Data

(63) Continuation of application No. PCT/IB2020/058885, filed on Sep. 23, 2020.

(30) Foreign Application Priority Data

Sep. 23, 2019 (IL) .......................... 269566

(51) Int. Cl.
*B23K 26/03* (2006.01)
*B23K 26/062* (2014.01)

(52) U.S. Cl.
CPC ........ *B23K 26/032* (2013.01); *B23K 26/0344* (2015.10); *B23K 26/062* (2015.10)

(58) Field of Classification Search
CPC ................ B23K 26/034; B23K 26/032; B23K 26/0622; B23K 26/03; B23K 26/40;
(Continued)

(56) References Cited

U.S. PATENT DOCUMENTS 5,037,200 A 8/1991 Kodama
5,081,900 A 1/1992 Buntzen et al.
(Continued)

FOREIGN PATENT DOCUMENTS

CN 207571035 U 7/2018
DE 102013007442 A1 11/2013
(Continued)

OTHER PUBLICATIONS

Glen P. Perram et al., High energy laser weapons: technology overview https://www.researchgate.net/publication/238581076_High_energy_laser_weapons_Technology_overview, Sep. 2004, Proc. of SPIE vol. 5414, pp. 1-25.
(Continued)

*Primary Examiner* — Chris Q Liu
(74) *Attorney, Agent, or Firm* — The Roy Gross Law Firm, LLC; Roy Gross

(57) ABSTRACT

Embodiments pertain to a system for controlling outputting of light towards objects, the system comprising a detection subsystem configured to detect, for at least one object, one or more values of object characteristics, the object characteristics comprising, at least, electromagnetic absorption characteristics, wherein detection of object characteristic values is performed such that the object remains structurally intact; a light source subsystem comprising at least one light source for generating output light and directing the output light towards an object; and a controller configured to control, based on the detected object characteristics values, at least one operational parameter value of the at least one light source such that at least some of the output light that is directed towards the object has electromagnetic characteristics that correspond to the detected values of the electromagnetic absorption characteristics of the object, in order to structurally change at least part of the respective object.

13 Claims, 10 Drawing Sheets

(58) Field of Classification Search
CPC .......... B23K 2103/50; B23K 26/0006; B23K 26/60; B23K 26/702; B23K 15/0013; B23K 15/0086; B23K 15/02; B23K 2101/001; B23K 2103/52; B23K 2103/56; B23K 26/0344; B23K 26/04; B23K 26/046; B23K 26/06; B23K 26/0604; B23K 26/062; B23K 26/064; B23K 26/0643; B23K 26/0665; B23K 26/067; B23K 26/0676; B23K 26/08; B23K 26/0853; B23K 26/0869; B23K 26/103; B23K 26/1224; B23K 26/1462; B23K 26/342; B23K 26/352; B23K 26/354; B23K 26/361; B23K 26/382; B23K 26/705
USPC .......... 219/121.62, 121.72, 121.83, 121.61, 219/121.67, 121.69, 121.76, 121.85, 219/121.64, 121.65, 121.66, 121.73, 219/121.75, 121.8, 121.84, 702, 76.12
See application file for complete search history.

(56) References Cited

U.S. PATENT DOCUMENTS

| | | | |
|---|---|---|---|
| 5,450,207 | A | 9/1995 | Fomenkov |
| 6,653,971 | B1 | 11/2003 | Guice et al. |
| 8,309,883 | B2 | 11/2012 | Reeves-Hall et al. |
| 8,994,934 | B1 | 3/2015 | Nelson et al. |
| 9,086,375 | B2 | 7/2015 | Priest et al. |
| 9,574,854 | B2 | 2/2017 | Jonas |
| 2006/0000813 | A1 | 1/2006 | Engler et al. |
| 2006/0153996 | A1 | 7/2006 | Stanek et al. |
| 2006/0243708 | A1 | 11/2006 | Ikenoue |
| 2006/0281560 | A1 | 12/2006 | Troitski |
| 2007/0215582 | A1 | 9/2007 | Roeper et al. |
| 2008/0226153 | A1 | 9/2008 | Ono et al. |
| 2008/0259340 | A1 | 10/2008 | Prasad et al. |
| 2008/0291451 | A1 | 11/2008 | Cheng |
| 2009/0127233 | A1 | 5/2009 | Asano et al. |
| 2010/0174533 | A1 | 7/2010 | Pakhomov |
| 2011/0017715 | A1 | 1/2011 | Marcus et al. |
| 2011/0103410 | A1 | 5/2011 | Hutchin |
| 2011/0284510 | A1* | 11/2011 | Reeves-Hall ...... B23K 26/0853 219/121.72 |
| 2011/0306956 | A1 | 12/2011 | Islam |
| 2012/0000893 | A1 | 1/2012 | Broude et al. |
| 2013/0087540 | A1 | 4/2013 | Gu et al. |
| 2013/0153552 | A1 | 6/2013 | Jeong et al. |
| 2013/0213946 | A1 | 8/2013 | Morikazu |
| 2013/0215912 | A1 | 8/2013 | Shkunov et al. |
| 2013/0271752 | A1 | 10/2013 | Bellian et al. |
| 2013/0293882 | A1 | 11/2013 | Dottery et al. |
| 2014/0118722 | A1 | 5/2014 | Treado et al. |
| 2014/0125964 | A1 | 5/2014 | Jonas |
| 2014/0153592 | A1 | 6/2014 | Nishikata et al. |
| 2014/0218790 | A1 | 8/2014 | Hagen |
| 2015/0070756 | A1 | 3/2015 | Priest et al. |
| 2015/0369570 | A1 | 12/2015 | Conemac |
| 2016/0266244 | A1 | 9/2016 | Holmes et al. |
| 2016/0286779 | A1 | 10/2016 | Guice |
| 2017/0216971 | A1 | 8/2017 | DeMuth et al. |
| 2017/0234658 | A1 | 8/2017 | Segev et al. |
| 2019/0062196 | A1 | 2/2019 | Bui |
| 2019/0283177 | A1 | 9/2019 | Kakizaki |

FOREIGN PATENT DOCUMENTS

| | | |
|---|---|---|
| EP | 2442131 A1 | 4/2012 |
| EP | 2680031 A1 | 1/2014 |
| EP | 3118561 A1 | 1/2017 |
| EP | 3163320 B1 | 12/2017 |
| JP | 2016131981 A | 7/2016 |
| WO | 0229853 A2 | 4/2002 |
| WO | 2016059936 A1 | 4/2016 |

OTHER PUBLICATIONS https://en.wikipedia.org/wiki/Fourier-transform_infrared_spectroscopy, Revision of Jun. 7, 2019, 11:13.
https://people.csail.mit.edu/jaffer/FreeSnell/polyethylene.html, First published in 2006, Last accessed on Feb. 6, 2020.
L. R. Painter et al., Optical Properties of Polyethylene: Measurement and Applications, Radiation research, vol. 83, No. 1, (Jul. 1980), pp. 1-18.
PCT International Search Report for International Application No. PCT/IB2020/058885, mailed Dec. 15, 2020, 4pp.
PCT Written Opinion for International Application No. PCT/IB2020/058885, mailed Dec. 15, 2020, 5pp.
Israeli Patent Office 1st Examination Report for Israeli Patent Application No. 269566, mailed May 7, 2020, 9pp.
Israeli Patent Office 2nd Office Action/Examination Report for Israeli Patent Application No. 269566, mailed Aug. 4, 2020, 10pp.
Indian Patent Application No. 202227009389, Office Action dated Aug. 5, 2022.
Extended European Search report mailed Nov. 7, 2022 for EP application 20869733.4.

* cited by examiner

SYSTEM AND METHOD FOR CONTROLLING OUTPUT OF LIGHT TOWARDS OBJECTS

CROSS REFERENCE TO RELATED APPLICATIONS

This application is a Bypass Continuation of PCT Patent Application No. PCT/IB2020/058885, having International filing date of Sep. 23, 2020, which claims the benefit of Israeli Patent Application No. 269566, filed on Sep. 23, 2019, the contents of which are all incorporated herein by reference in their entirety.

The present disclosure relates in general to systems and methods for controlling output of light from one or more light sources and directing thereof towards objects.

BACKGROUND

Laser based systems for emission of light in a narrow wavelength band can be used for numerous industrial purposes such as for laser cutting, welding, perforating and the like as well as for other purposes such as in medicine (e.g. in laser surgery in which laser is used for cutting tissue). Laser cutting typically involves using a high-power laser beam and directing thereof towards a target to be cut.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

DETAILED DESCRIPTION

Figure 1A:
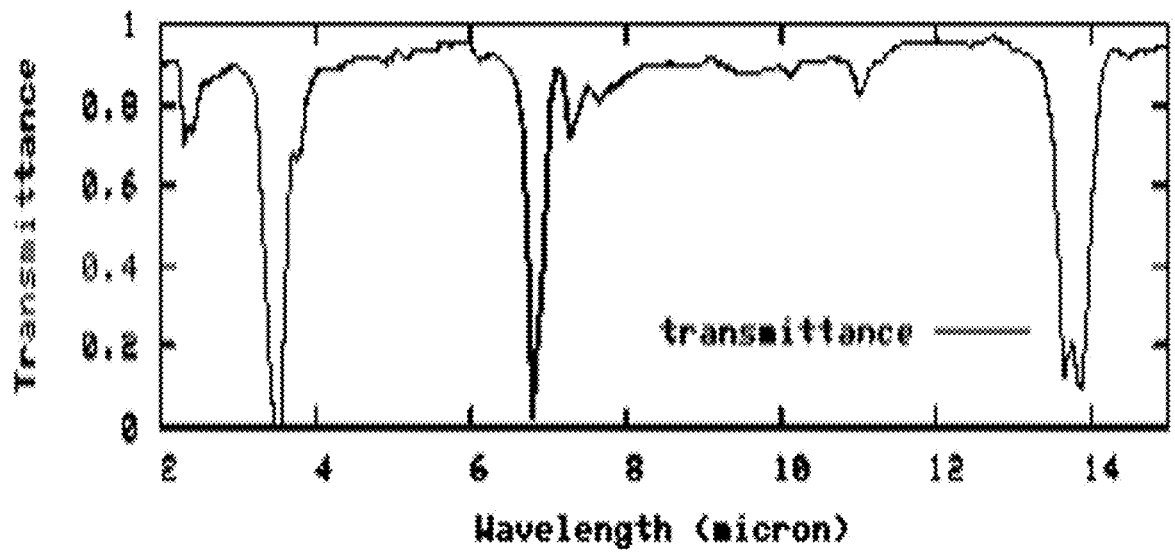
FIG. 1A shows an absorption spectrum of a polyethylene film.

Aspects of disclosed embodiments pertain to systems, devices and methods for detection one or more values of one or more object characteristics including at least electromagnetic absorption characteristics (such as one or more optical absorption wavelengths and/or optical absorption wavelength bands) of objects, in where the detection of object characteristic values is performed such that the object remains structurally intact (e.g., on a macroscopic scale); and controlling one or more operational parameter values such as output beam wavelength(s) or wavelength band(s) of one or more light sources used for output and directing of light thereof towards each specific object, where the output light corresponds to the detected values of the one or more object characteristics value(s), in order to structurally change (e.g., on a macroscopic scale) at least part of the respective object.

It is noted that the term "object", used herein, may relate to any physical entity, body, structure and/or form.

It is noted that the term "output light" may relate to any form of radiation of light such as light emission, light dispersion, light induction and the like.

It is noted that the term "light source" may relate to any one or more devices and/or systems configured to output light (irradiate light).

It is noted that the terms "detect" may relate to any one or more of: "identify", "measure", "discover", "search", "select", "receive", "retrieve" and/or any other form of collection of information.

It is noted that the term "method", used herein, may also encompass the meaning of the term "process".

It is noted that the term "optical wavelength" or "wavelength" used herein may relate also to "optical frequency" or "frequency", respectively, which may be derived from the optical wavelength.

It is noted that the term "object characteristic" may relate to any property of an object such as physical, optical, electromagnetic, chemical, biological property and the like.

The term "electromagnetic absorption characteristic(s)" may relate to absorption characteristic(s) of materials in any one or more parts of the electromagnetic spectrum, e.g. ionizing and/or non-ionizing radiation spectrum, such as, for example, the visible and/or non-visible optical electromagnetic spectrum, infrared (IR) ultra-violate (UV), radio-frequency (RF), microwave spectrum, X-Radiation, gamma radiation and the like.

According to some embodiments, there is provided a system for controlling output of light towards objects, which may include: a detection subsystem configured to detect one or more values of object characteristics, for each object, the object characteristics including, for example, at least electromagnetic absorption characteristics; a light source subsystem comprising at least one light source for generating output light and directing the output light towards the respective object; and a controller configured to control, based (at least) on the one or more detected values of the electromagnetic absorption characteristics of the object, at least one operational parameter value of the at least one light source such that at least some of the output light that is directed towards the specific object has electromagnetic characteristics that correspond to the detected values of the electromagnetic absorption characteristic(s) of the specific object.

According to some embodiments, using the specific electromagnetic absorption characteristic(s) of each specific object for outputting light thereto that has corresponding output light operational parameter value(s) may be done to optimize (e.g. maximize) the energy absorption in the respective object, optionally enabling thereby to use a reduced output light power for causing a desired effect over the respective object such as for cutting, perforating, welding, damaging, burning, heating of the object and the like.

The energy absorption of an object may depend on resonance absorption line(s) of the material(s) from which the object is made. A resonance absorption line may be defined as an absorption wavelength or wavelength band (typically narrow band) that is best absorbed by a specific object material. Some materials have more than a single resonant absorption line and hence more than one best absorbed optical wavelengths or wavelength bands.

According to some embodiments, the detection subsystem may use any one or more detection techniques and/or devices such as, for example one or more of: an optical spectrometer, using one or more spectrometry techniques such as a Raman spectrometer and/or a laser-induced breakdown spectrometer; an interferometer, using one or more interferometry techniques, such as a Fabry-Perot spectrometer and/or a Fourier Transform Infrared (FTIR) based interferometer; an optical detector; and/or an interferometry-based wavelength detection e.g. using interferometry-based wavelength meter.

Figure 1B:
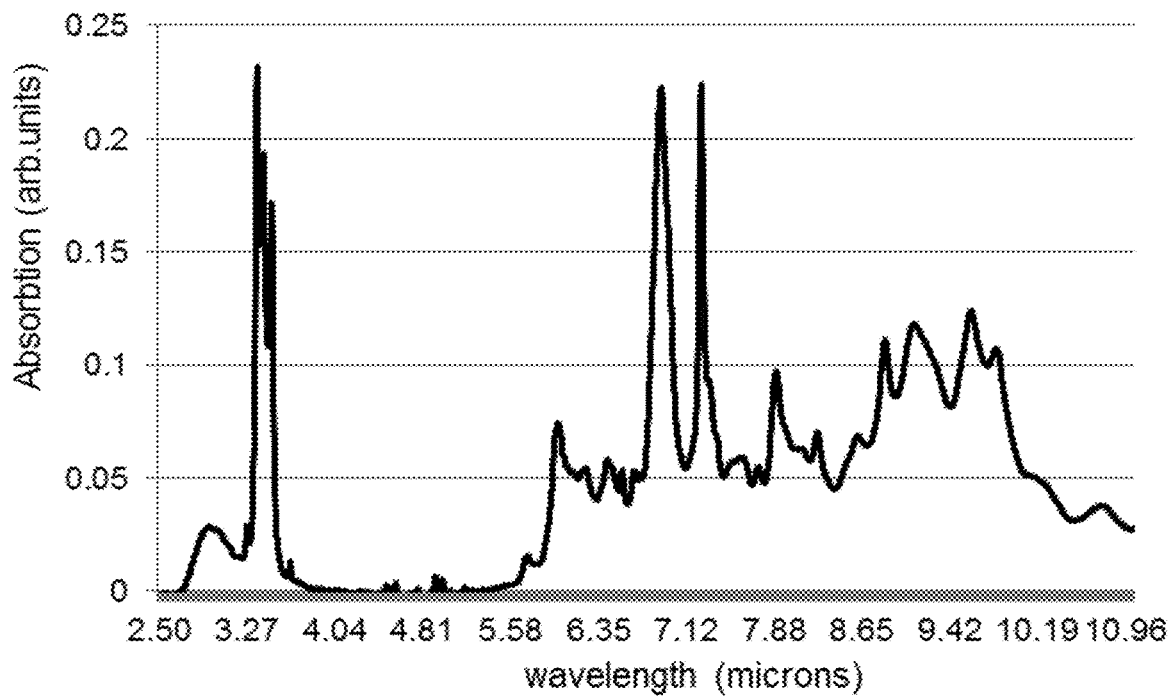
FIG. 1B shows an absorption spectrum of natural rubber latex (NRL).

FIG. 1A and FIG. 1B show experimental results indicating the wavelength energy absorption spectrum for a polyethylene film (FIG. 1A) and for a natural rubber latex (NRL) (FIG. 1B), both showing at least one clear absorption wavelength in the mid-infrared (mid-IR) i.e. in a wavelength band of around the 3.3 μm (micrometer).

These two industrial materials of polyethylene and NRL have been tested for the influence of a resonant laser wavelength cutting efficiency in comparison with standard 1.06 μm (micrometer) reference laser. The two materials, namely Polyethylene and NRL, have been irradiated, by using an increasing power density for a constant time period using two different laser output wavelengths regions: 1 μm (micrometer) and a mid-IR beam. As shown in FIGS. 1A and 1B, both materials have a strong absorption line in mid-IR of about 3.3 μm (micrometer) for polyethylene (C—H stretch vibration) and 3.4 μm (micrometer) for NRL (O—H stretch vibration). In both cases, the threshold power density needed for cutting through the material was about 3 Watt/cm$^2$ with the mid-IR resonant laser beam (matching absorption wavelength band). Using a non-resonant laser source such as yttrium aluminum garnet (YAG) laser operating at wavelength 1.06 μm (micrometer), required a power density of more than 10,000 Watt/cm$^2$ in order to achieve a similar cutting effect.

This shows that at least for some object materials, using output light that matches or is closest to the absorption wavelength(s) of the object, dramatically reduces the required power (or power density) for achieving a desired effect over the object such as for cutting, perforating, welding, heating thereof and the like.

Embodiments of disclosed systems, devices and methods may enable detection of values of object characteristics including at least values of electromagnetic absorption characteristics of various different objects having different object characteristics and fit output light operational parameters values for each different object in a personalized manner, based on values of object characteristic of the object, such as to maximize effect caused thereto and/or to save output power while achieving a desired effect thereto, by maximizing energy absorption of the output light by each different object e.g. by adjusting output light wavelength(s) to the specific personal absorption wavelength(s) of the respective object.

Various physical properties of a given object may determine the electromagnetic absorption characteristic(s) thereof, such as the object's absorption wavelength. For example, the physical properties may include the chemical/material composition of the object, structure of the object or parts thereof (grid, crystalized, or unordered structure, layers of materials from which the object is made of or just the outer coating layer, etc.), matter state and/or viscosity level (e.g. gas, liquid, gel, solid, rigidity level etc.), material density, temperature of the object, optical properties of the object such as scattering rate (reflectivity, glow and/or light emission characteristics of the object), color of the object, and the like.

Various additional physical object characteristics' values of a given object may further be taken into consideration when selecting (controlling) operational parameters values, for further improving the absorption of the output light by the object and hence improve the desired effect caused to the object by emission of output light thereto, as well as for directing the outputted light towards the object. For example, the physical characteristics of the respective object may include: material composition of the object, state and/or structure of the object; the position and/or orientation of the object relative to at least one reference position; distance between the object and the at least one light source used for outputting light thereto; environmental conditions in a region of interest (ROI) in which the object is located (e.g. wind, temperature etc.); the size and/or the shape of the object; the weight of the object; the material density of the object; the surface area (topography) of the object; object motion parameters such the velocity and/or acceleration rate, optical properties of the object (transparent, reflective, etc.), etc.

According to some embodiments, another feature that may determine one or more of the values of the operational parameters is a desired effect to be caused to the one or more object. For example, for slightly melting the object or part thereof e.g. for adhering thereof to another object, a much lower power may be required than if the desired effect is cutting or perforating that same object. Therefore, the controlling (e.g. setting) of values of operational parameters may be based on: (i) the desired effect to the specific object, (ii) the electromagnetic absorption characteristics values of the specific object, and optionally (iii) other object characteristics values such as object location, motion related parameters values (e.g. velocity and/or acceleration rate), and the like.

As mentioned above, the systems, methods and devices described herein may be used for causing one or more desired effects over objects such as, for example for causing one or more of the below optional effects over the object and/or part thereof: cutting, perforating, melting, heating, deforming, causing damage, welding, reduce and/or destroy lift force acting on the object (if airborne), and/or the like.

According to some embodiments, the one or more electromagnetic absorption or other object characteristics of objects towards which the system should output light, may not be known in advance to the system, requiring, for instance, on-site detection of the values of object characteristics for each object including at least its electromagnetic absorption characteristics.

According to some embodiments, in order to determine at least one of the one or more object characteristics values of each object to be irradiated by the one or more light sources of the system, the detection subsystem may be configured to one or more of:

measure one or more values of optical object characteristics of each object (e.g. being located on-site or in detection view of each object and being configured for real time (RT) or near RT optical detection;

identify one or more materials from which each object is made of and thereby identifying values of electromagnetic absorption and/or other values of object characteristics thereof; and/or acquiring and analyzing visual data of each object for determining identity thereof and detecting its respective values of object characteristics, according to the determined identity of the respective object.

According to some embodiments, the detection of the values of the object characteristics, such as the optical electromagnetic absorption characteristics, of each object may be carried out in an active manner e.g. by emitting light towards the object and detecting light reflected from the object for detecting influence of the emitted light by detecting changes between the reflected and emitted light for the detection of absorption wavelength(s) of the respective object. According to some embodiments, the electromagnetic flux of the output light directed towards the respective object for structurally changing at least part thereof is of significantly higher electromagnetic flux than the electromagnetic flux of light emitted for actively detecting the values of object characteristics of the respective object, for maintaining the respective object structurally intact (e.g., on a macroscopic scale) during detection of its object characteristics values.

For example, the active optical measuring of the one or more object absorption wavelength(s) may be carried out by using one or more of the following techniques: optical spectrometry (such as Raman spectrometry, laser-induced breakdown spectrometry (LIBS)); and/or interferometry (e.g. Fourier Transform Infrared (FTIR) based interferometry and/or Fabry-Perot spectrometry), using associated optical measuring devices such as the associated one or more optical detectors, spectrometers and/or interferometers as part of the detection subsystem.

Additionally or alternatively, the measuring for detection of the one or more object characteristics values may be carried out in a passive manner, e.g. by detecting light reflected from the object for detecting values of the one or more absorption characteristics of the object (e.g. absorption wavelength(s) and/or band(s)).

According to some embodiments, the system may also be configured to detect multiple different objects in a region of interest (ROI) that may have different values of electromagnetic absorption characteristics (e.g. absorption wavelength(s)) and detect those absorption and other characteristics such as their location(s) and carry out simultaneous and/or consecutive outputting and directing of the light from the one or more light sources towards these objects, e.g. by simultaneous adjustment of wavelength and values of other output light operational parameters of multiple light sources and/or by emitting light of fitted power and absorption characteristics towards each object at a different time frame in a sequential manner (e.g. a single light emission shot of the corresponding operational parameters values for each object).

In some cases, one or more of the objects that the system is required to irradiate may be moving objects such as vehicles, airborne objects (power or non-powered) etc., which may be remotely located from the system. The system in those cases may be configured to enable detecting in real time (RT) or near RT time of moving objects and values of additional object characteristics thereof (such as RT detection of location of each object and its respective electromagnetic absorption and other object characteristics) and RT and/or near RT (in respect to the detection time) controlling of the output of light towards the one or more moving objects corresponding to the detected object characteristics values e.g. by setting output light operational parameters values such as beam direction, output power/amplitude/intensity and wavelength(s), emission duration, focusing level, emission frequency, spatial coherence level, and like, according to the each object's location and distance from the light source, at the emission time, according to its velocity and/or acceleration rate and absorption properties.

A distance D between the light source and a point where the light hits the object may be equal or exceed a lower distance threshold Dmin. Distance D may be, for example, at least, 2 meters, 3 meters, 4 meters, 5 meters, 10 meters, 100 meters or higher. In some embodiments, the distance may be defined as being at least 2, 3, 4, 5, 10 or 100 times larger than the object's maximum length dimension.

According to some embodiments, the system may also be configured to carry out a verification process for verifying resulting effect caused by the output of light towards each object, where the verification results may be displayed and/or stored for future learning and improving of system operation. The verification process may include, for instance, comparing the desired effect with the actual effect using one or more verification analysis programs.

According to some embodiments, the verification of the resulting effect over the object may include, for example measuring the resulting success rate for causing the desired effect over each object, e.g. by using at least one measuring device configured to measure at least one effect parameter indicative of the effect of the output of light towards the object; and/or receiving user feedback indicative of the effect caused to the object by the output of the light thereto.

According to some embodiments, verification information indicative for example, of the actual effect caused by the emitted light to various objects over time and optionally other system parameters of each emission event such as power used, light direction parameters and the like may be accumulated (e.g. stored in a structured manner) and used for learning each emission event e.g. by operating at least one learning program, ultimately for improving future detection and controlling processes of the system.

According to some embodiments, various additional optical devices and/or elements may be used for the detection of object characteristics and/or for outputting and directing of light for effecting each object. For example, the one or more light sources used for irradiating each object (either for effecting thereof and/or as part of the detection of object characteristics thereof) may include optical elements such as lenses and/or phase elements e.g. for focusing the light over the object, for improving long-distance spatial coherence of the output light and the like.

Figure 2:
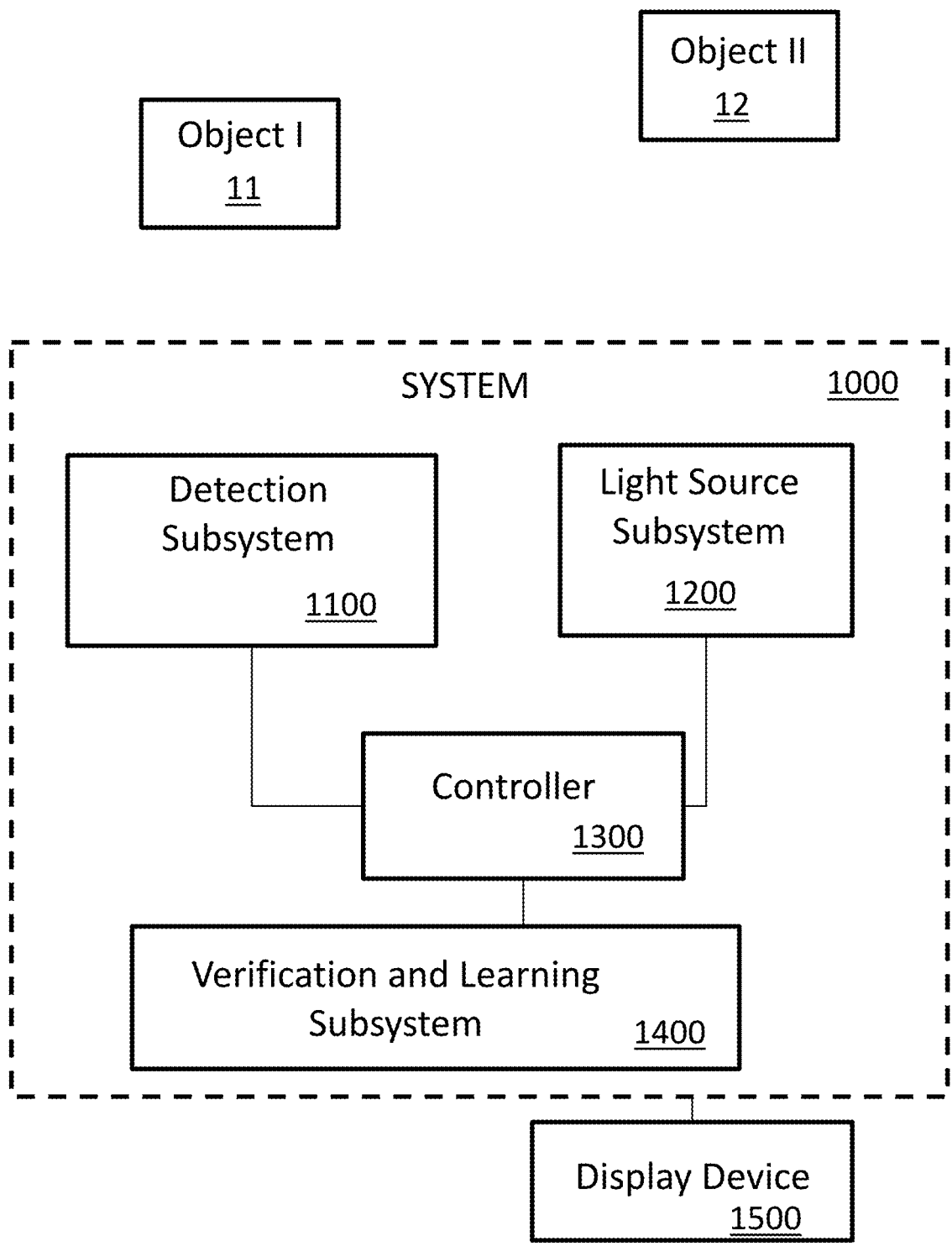
FIG. 2 is a block diagram, schematically illustrating a system for outputting of light towards objects, according to some embodiments.

Reference is now made to FIG. 2 schematically illustrating a system 1000 for outputting light towards objects such as objects 11 and/or 12, according to some embodiments.

The system 1000 may include a detection subsystem 1100; a light source subsystem 1200; a controller 1300; and optionally also a verification and learning subsystem 1400.

According to some embodiments, the detection subsystem 1100 may be configured to detect one or more values of object characteristics for various objects, wherein the object characteristics include at least the electromagnetic absorption characteristics of each object (e.g. absorption wavelength(s) and/or absorption wavelength band(s)).

Values of other objects characteristics may be detectable by the detection subsystem 1100 such as one or more of the following characteristics for each object: object location; object motion characteristics such as velocity (speed) and/or acceleration rate; object material composition; object relative distance e.g. distance between the object and one or more reference points (such as the distance between the output light source to be used and the object); object material density and/or state (rigid, gas, solid etc.); object temperature; and the like.

According to some embodiments, the detection subsystem 1100 may include one or more detectors and/or sensors for detection (e.g. identifying) each object in a ROI, and for detection of values of object characteristic(s) for each detected object. For example, the detection subsystem 1100 may include one or more visual imagery detectors configured to acquire visual data of the ROI, such as one or more cameras (e.g. video and/or stills camera(s)), IR cameras or sensors and/or 3D sensors etc., one or more optical sensing devices for measuring absorption characteristics of each object such as one or more optical spectrometers and/or interferometers, one or more environmental sensors or devices such as devices for measuring temperature in the ROI and the like.

According to some embodiments, the detection of objects may be carried out by the detection subsystem 1100 and by the controller 1300 e.g. by using one or more detectors of the detection subsystem 1100, for acquiring visual data as of the ROI such as one or more cameras, and by processing acquired visual data (e.g. using one or more image analysis programs) for identification of objects therein, using one or more processing units operable via the controller 1300 and/or via the detection subsystem 1100.

The term "program" used herein may refer to any computerized process executable and carried out by one or more software and/or hardware modules. The processing of the acquired visual data may also include identification of position (location) of each detected object and/or other object characteristics for each detected object such as object motion characteristics (speed/acceleration), object dimensions (volume, shape, topography etc.); object identity (specific vehicle type, artifact type etc.), optical characteristics of the object etc.

Other object characteristics may additionally or alternatively be derived from the visual data processing results such as the material(s) composition from which each object is made, which may then be used (e.g. via further data analysis), for determining the absorption characteristics of each object, may be derived from the identity of the object. For example, by identifying a type of object such as a horse shoe and its manufacturing origin, using image analysis of video data, the material from which a horse show is made of (such as a compound including mostly iron) may be derived from the identification of the identity of the object e.g. by searching through objects identities archives in which each object identity is associated with a typical object material composition. The optical properties of the object such as its color, transparency and/or reflectivity levels, may also be used to refine detection of electromagnetic absorption characteristics of each specific detected object.

In some embodiments, the location of each object (e.g. amongst various possible different objects) may be known in advance enabling the detection subsystem 1100 detection devices to be fixedly located. For example, in an assembly line configuration, in which the different objects are placed over an assembly line conveyor (not shown) each in a designated location over the conveyor, the detection subsystem 1100 may detect the identity of the objects using imagery thereof and estimate its identity from a known list of optional objects, and detect its one or more values of one or more object characteristics according to its respective identity. In this configuration, the light source subsystem 1200 may then be set for effecting the specific object according to its one or more detected values of object characteristics for effecting thereof (e.g. for welding, perforating, heating, melting and/or cutting thereof).

Additionally or alternatively, the system 1000 may be configured to locate previously unknown objects and detect their object characteristics' values without previously knowing for example each object's position, identity, type and/or motion state (still object, moving object, accelerating object etc.). In this case the system 1000 may be configured to detect each object and its one or more associated object characteristics' values in RT or near RT.

According to some embodiments, to detect the values of absorption characteristics such as the absorption wavelength(s) or wavelength band(s) of each detected object, the detection subsystem 1100 may use one or more designated detection devices, each specifically designed for active and/or passive optical measuring of absorption wavelength(s) of each object such as one or more spectrometers and/or interferometers.

According to some embodiments, the detection subsystem 1100 may include one or more optical detectors and/or cameras such as IR camera(s), video camera(s) etc. for detection of objects and optionally also for detection of one or more object characteristics' values of each of the objects (e.g. in RT or near RT).

According to some embodiments, the light source subsystem 1200 may include one or more light sources such as one or more laser devices, configured for selectively emitting light in one or more optical wavelengths and/or wavelength bands. For example, the light source subsystem 1200 may include a tunable laser, configured to allow selection of output wavelength and/or wavelength band out of multiple available wavelengths and/or bands; and/or multiple laser devices each configured for outputting light in a different wavelength and/or wavelength band such that the controller 1300 is configured to select the output wavelength and/or wavelength band by either tuning the tunable laser to the desired wavelength and/or band value; and/ or choose the appropriate laser device (emitting in a single wavelength and/or band), according to values of absorption wavelength(s) and/or band(s) of the respective object to be irradiated such as object I 11 and/or object II 12.

According to some embodiments, the controller 1300 may be programmable such as to fit different system's 1000 requirements and different detection subsystem 1100 and/or light source subsystem 1200 configuration. The controller 1300 may be configured to work in different optional working modes (e.g. using user selection interface), each associated with a different system configuration. For example, the controller 1300 may have two different working modes:

(i) a first output control mode—in which the controller 1300 is connected separately to each laser device of the light source subsystem 1200 e.g. via a channeling device and selects the appropriate laser device(s) for outputting light thereby, according to the absorption wavelength(s) of the respective object.

(ii) a second output control mode—in which the controller 1300 connects to a tunable laser device enabling selection of a single output light wavelength and/or band from multiple available output light wavelengths and/or bands.

Each output control mode may be assignable (e.g. by a user using a designated controller user interface (UI)), with selectable object and/or object characteristics detection options of the detection subsystem 1100.

This may allow the user to choose controller 1300 operation modes that correspond to the available devices used by the detection subsystem 1100 and/or by the light source subsystem 1200 and optionally also enable changing, over time, object and object characteristics detection and light outputting techniques and devices.

According to some embodiments, as shown in FIG. 2, the system 1000 may also include and/or be operatively associated with one or more display devices such as display device 1500, for outputting and displaying information relating to objects' detection and irradiation, effect-causing verification results and the like. The one or more display devices 1500 may include for example, visual display device(s) such as one or more screens, touch screens and the like, auditory display devices such as one or more speakers and/or the like.

Figure 3A:
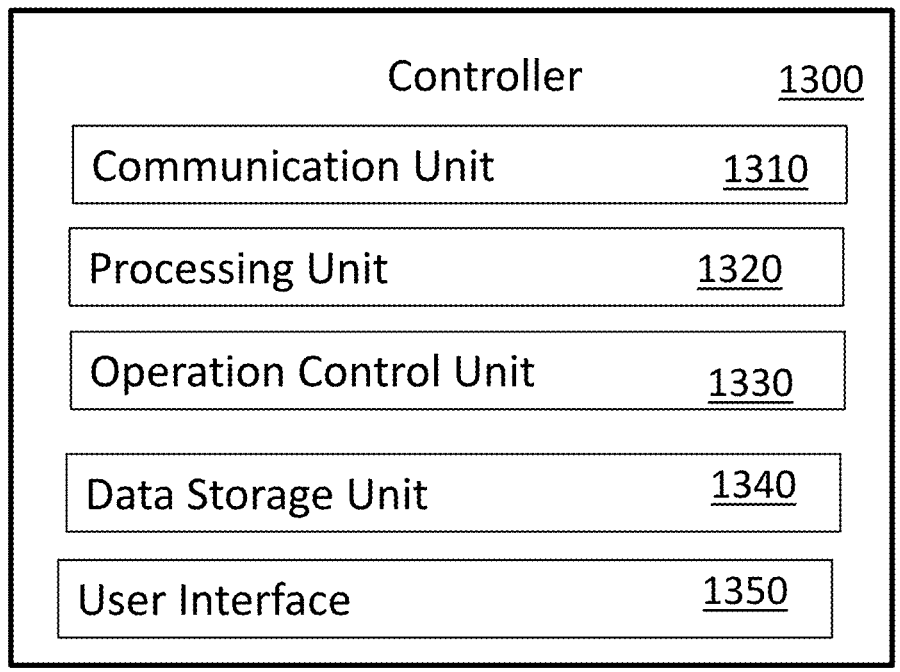
FIG. 3A shows a controller of the system illustrated in FIG. 2, for controlling output of light towards objects based on detected values of object characteristics, according to some embodiments.

FIG. 3A shows optional units of the controller 1300, according to some embodiments of the controller 1300. Each unit may include software, hardware and/or devices therein. The controller 1300 may include:

a communication unit 1310, which may be configured to control communication and communicate with all the subsystems 1100, 1200 and 1400 and optionally also with one or more remote devices via one or more communication links using one or more communication protocols, devices, networks and/or technologies for receiving and transmitting of data and/or for controlling thereof.

a processing unit 1320 configured for, receiving, retrieving, analyzing and/or storing of data. For example, the processing unit 1320 may be configured for analyzing visual data for detection of objects and for detection or calculating of object characteristics' values such as location, movement (velocity/acceleration rate) etc., and receive data arriving from one or more detection devices for detection of values of absorption characteristics of objects; and/or for determining (e.g. by calculating and/or associating) values of operational parameters associated with objects for controlling light source(s) output parameters values e.g. by using one or more control parameters values criterions for each object, based on all its associated object characteristics.

an operation control unit 1330 that controls the one or more output light sources and/or other devices of the light source subsystem 1200 such as light directing devices and the like, for each object, based on determined operational parameters values thereof. In some embodiments, the operation control unit 1330 may also be configured to control the detection subsystem 1100 e.g. by controlling ROI thereof, determine the detection mode, set the detection devices parameters etc.

a data storage unit 1340, which may include one or more databases for data storage and retrieval e.g. for storing therein object characteristics, verification information and the like.

According to some embodiments, the controller 1300 may include and/or operate a UI 1350, configured for example, for display of verification information and input of feedback, for display and manual control over values of operational parameters, selecting objects, and the like.

Figure 3B:
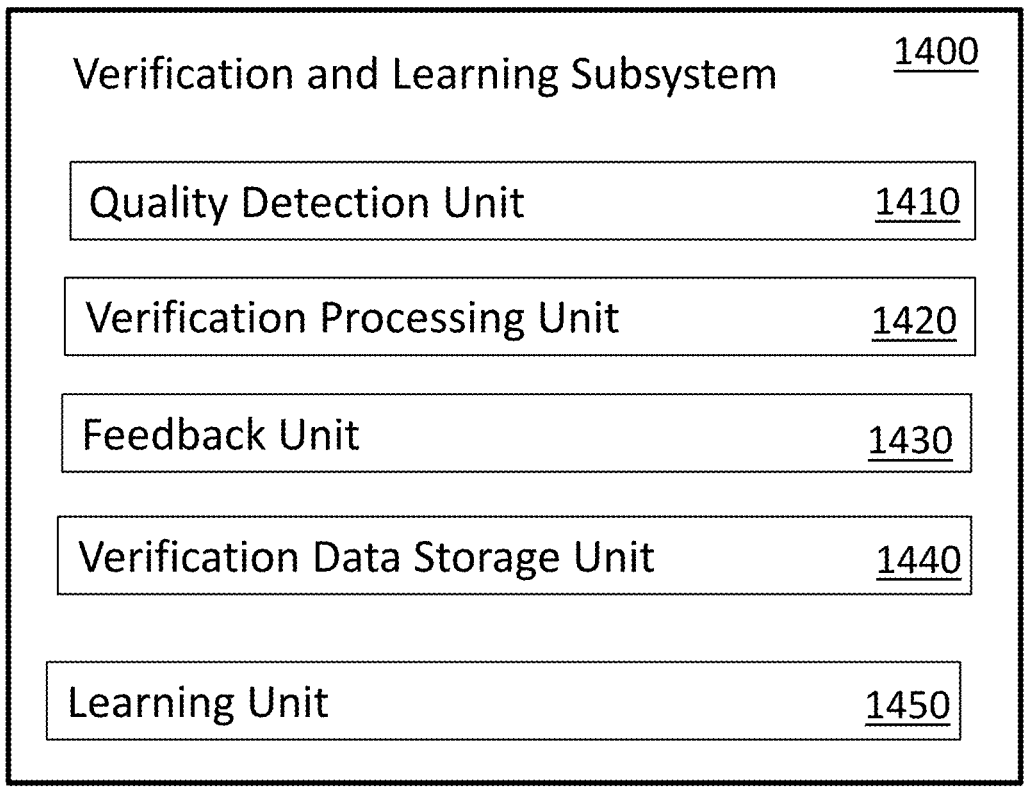
FIG. 3B shows a verification and learning subsystem of the system of FIG. 2, according to some embodiments thereof.

FIG. 3B shows optional units of the verification and learning subsystem 1400, according to some embodiments. The verification and learning subsystem 1400 may include:

at least one quality detection unit 1410, configured to detect one or more effect parameters, indicative of quality of the effect caused to each object by the irradiation of light thereto by the one or more light sources of the light source subsystem 1200. The quality verification unit may include or connect to one or more detection devices for detecting one or more effect parameters, such as one or more cameras embedded therein or connect to one or more detectors of the detection subsystem 1100;

a verification processing unit 1420, which may be configured to process the detected effect parameters and calculate one or more quality parameters values associated at least with a success rate of the irradiation (herein also "irradiation event") of the respective object in relation to the estimated and/or desired effect;

a feedback unit 1430, which may be operable via a designated feedback UI (not shown), configured to enable users to manually input feedback relating to success rate of each irradiation event e.g. via designated input fields directing the user to quantify his/her feedback;

verification data storage unit 1440, configured to store and accumulate all information associated with each irradiation event (e.g. including detected object identity and object characteristics, values of operational parameters, users feedback, verification information (effect parameters); additional event related information such as the desired effect, time and ROI information and the like; and a learning unit 1450, optionally configured to operate one or more learning programs and/or algorithms for sorting and learning from accumulated events information, in which objects have been irradiated by the system 1000, and optionally also for programming various programmable settings of the controller 1300, the detection subsystem 1100 and/or the light source subsystem 1200 according to results of the learning process.

For example, the learning unit 1450 may change a calculation equation for determining minimum power of output light in relation to object characteristics' values such as object's distance from light source, object material composition and density and the like for improving power utilization versus achieving the desired effect.

For example, the feedback unit 1430 UI may include a designated feedback input field that simply requires the user to mark a checkbox with "v" for a successful irradiation (i.e. the effect was achieved) or an "x" if the irradiation event was not successful (i.e. the effect was not fully achieved). As another example, the user may be required to manually input effect parameters values according to separately detected results (e.g. by having a designated input field for each effect parameter type such as an input field for temperature measurements etc.).

According to some embodiments, the detection subsystem 1100 and/or the light source subsystem 1200 may be remotely located from the controller 1300, in which case, the controller 1300 communication unit 1310 may be configured for long-distance communication, optionally long-distance RT or near RT communication.

According to some embodiments, the verification and learning subsystem 1400 may be integrated in the controller 1300 as one unit or module thereof, while the measuring instrumentation used for measuring effect parameters values may be carried out by the detection subsystem 1100, wherein the controller 1300 controls verification related measurements and processes and optionally also saves and displays verification measurement information.

Figure 4:
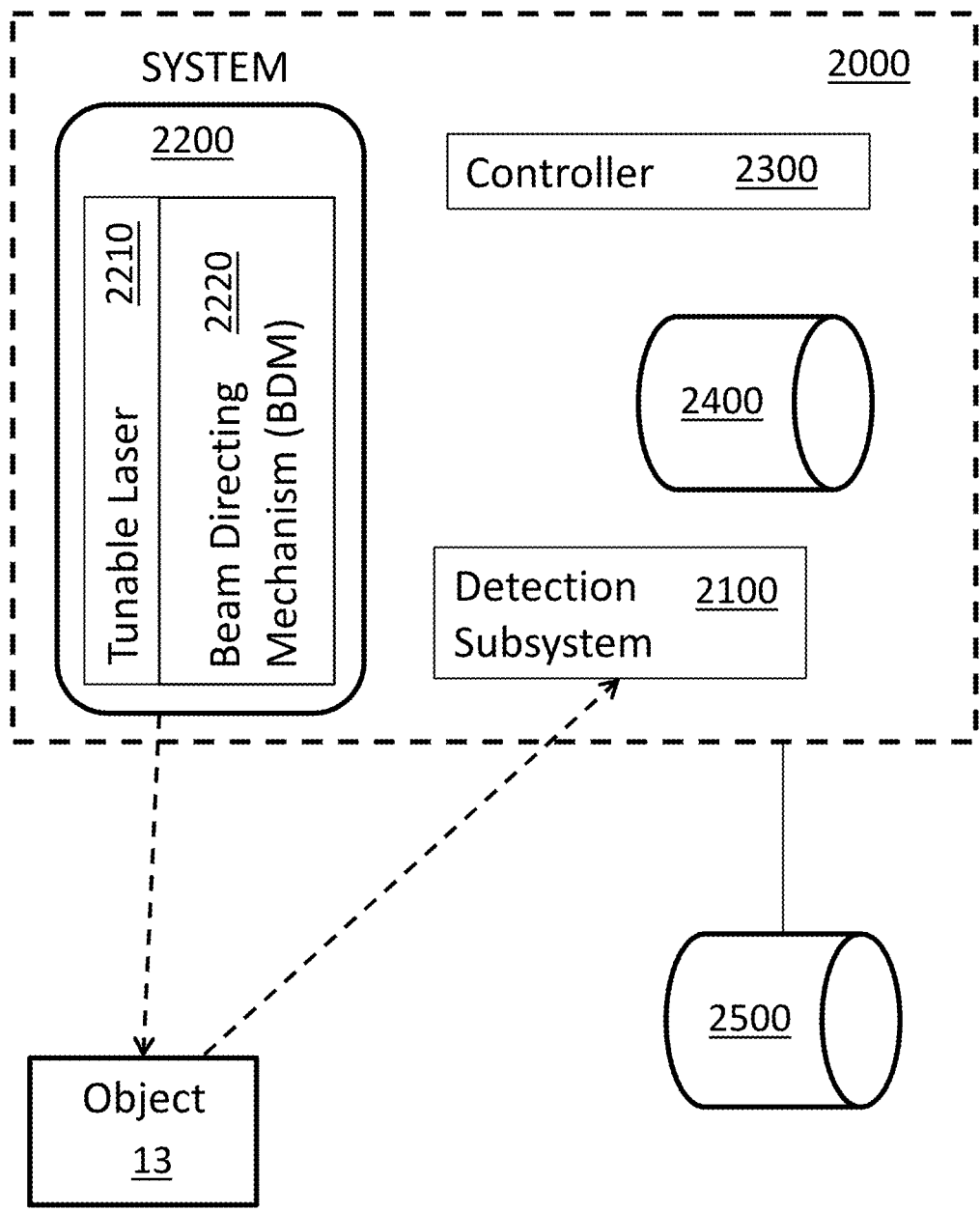
FIG. 4 shows a system for outputting of light towards objects, according to some embodiments, which includes one or more tunable lasers for outputting of light towards objects, in different wavelengths and/or wavelength bands in a selectable manner.

Reference is now made to FIG. 4, schematically illustrating a system 2000 for controlling output of laser light towards objects, according to some embodiments. This system 2000 includes:

A detection subsystem 2100 configured to detect values of one or more object characteristics for one or more different given object(s) at any given time, using one or more detection devices and/or techniques, such as one or more of: the optical measuring technique, the object material detection technique, and/or the visual object identity based technique, using the required devices and/or data processing program(s) associated with each technique.

A light source subsystem 2200 including, for example, one or more tunable laser devices such as tunable laser device 2210 and one or more beam directing mechanisms such as beam directing mechanism (BDM) 2220, configured for mechanically and adjustably directing the output laser beam towards objects, e.g. according to an estimated and/or measured object location at a given time. The BDM 2220 may be an integral part of the tunable laser device 2210 or operatively connected thereto. The BDM 2220 may include, for example, one or more mechanical mechanisms able to mechanically move the tunable laser device 2210 in any one or more of the three orthogonal spatial directions for aiming the output beam thereof towards the object, depending on object location. The BDM 2220 may also include one or more optical elements and/or devices for focusing the output light, maintaining beam coherency over distance and/or the like.

A controller 2300 configured at least to control the detection subsystem 2100 and the light source subsystem 2200, and optionally also to receive and/or transmit data at least to those subsystems 2100 and 2200.

The system 2000 may also include one or more databases for storage and retrieval of information such as an internal database (DB) 2400 and/or be able to retrieve information from one or more external sources such as external database (DB) 2500. For example, when using the visual object identity-based technique for detecting object characteristics for each object (including at least the electromagnetic absorption characteristics of the object), the DB 2500 may include for instance lists of objects' identities and their associated object characteristics such as their associated composition, dimensions, material density. Each object identity in the DB 2400 may also be associated with one or more corresponding operation control protocols, each protocol including a layout of associated operational parameters values or calculative programs thereof, for each respective associated desired effect. For example, for an object associated as being composed of NRL material and an absorption wavelength of 3.3 μm (micrometer), the operational parameters values may include 3.3 μm (micrometer) output beam wavelength and output power density of 3 Watt/cm2 for the effect of cutting the material. Each given object identity in the DB 2400 may be associated with a given set of object characteristics and several operation protocols each for a different desired effect, for example.

Some of the operational parameters' values may only be determined based on on-site measured values of object characteristics, at least for some objects such as moving objects. For example the output power of the output light may be dependent both on "fixed object characteristics" such as the object's dimensions, composition, absorption wavelength(s) and the like and "varying object characteristics" such as object's location (if moving) and therefore distance for output source, motion characteristics such as velocity and/or acceleration rate, environmental conditions, and the like. Therefore, each optional operation control protocol associated to each object may be programmable and include for example one or more equations for enabling automatic calculation of the values of operational parameters, based on fixed and varying object characteristics, where the varying object characteristics values may be automatically received by the controller 2300 from the detection subsystem 2100 and inputted into the programmable operation control protocol for calculating thereby the operational parameter values.

According to some embodiments, the detection subsystem 2100 may include one or more imagery devices such as one or more cameras for detecting objects and acquiring visual data thereof. The acquired visual data may then be analyzed, e.g. using one or more image analysis programs for detecting the identity of the object, the location and motion information of the object and other object characteristics. The one or more absorption wavelength(s) of the object may be measured separately by one or more measuring devices of the detection subsystem 2100 and/or identified in association with the identity of the object using the one or more databases 2400 and/or 2500.

For example, an unknown moving object 13 may be detected by the video camera(s) of the detection subsystem 2100 where the object's RT location and motion characteristics such as velocity and/or acceleration rate may be calculated by using video image analysis, e.g. via the controller 2300 processing unit, where the absorption wavelength(s) (lines) may be measured by using a spectrometer device of the detection subsystem 2100.

Once the object 13 characteristics including the absorption wavelength(s) and motion and location characteristics are detected, and given a specific desired effect to be caused to the object 13, the controller 2300 sets the corresponding values of operational parameters such as: (i) output light wavelength(s) that correspond to the absorption wavelength(s) of the object 13 (e.g. output wavelength(s) that are available by the tunable laser device 2210 that match or are closest to the object's absorption wavelength(s)); the minimal power required for causing the desired effect, based on the effect type, the absorption wavelength(s), the estimated distance between the object 13 and the laser being used, and optionally based on other system limitations; (iii) determine values of beam direction parameters, for adjusting the output light direction i.e. the laser beam direction so that the laser beam is directed towards an estimated location of the object 13 at the time the beam is outputted; and the like.

Figure 5:
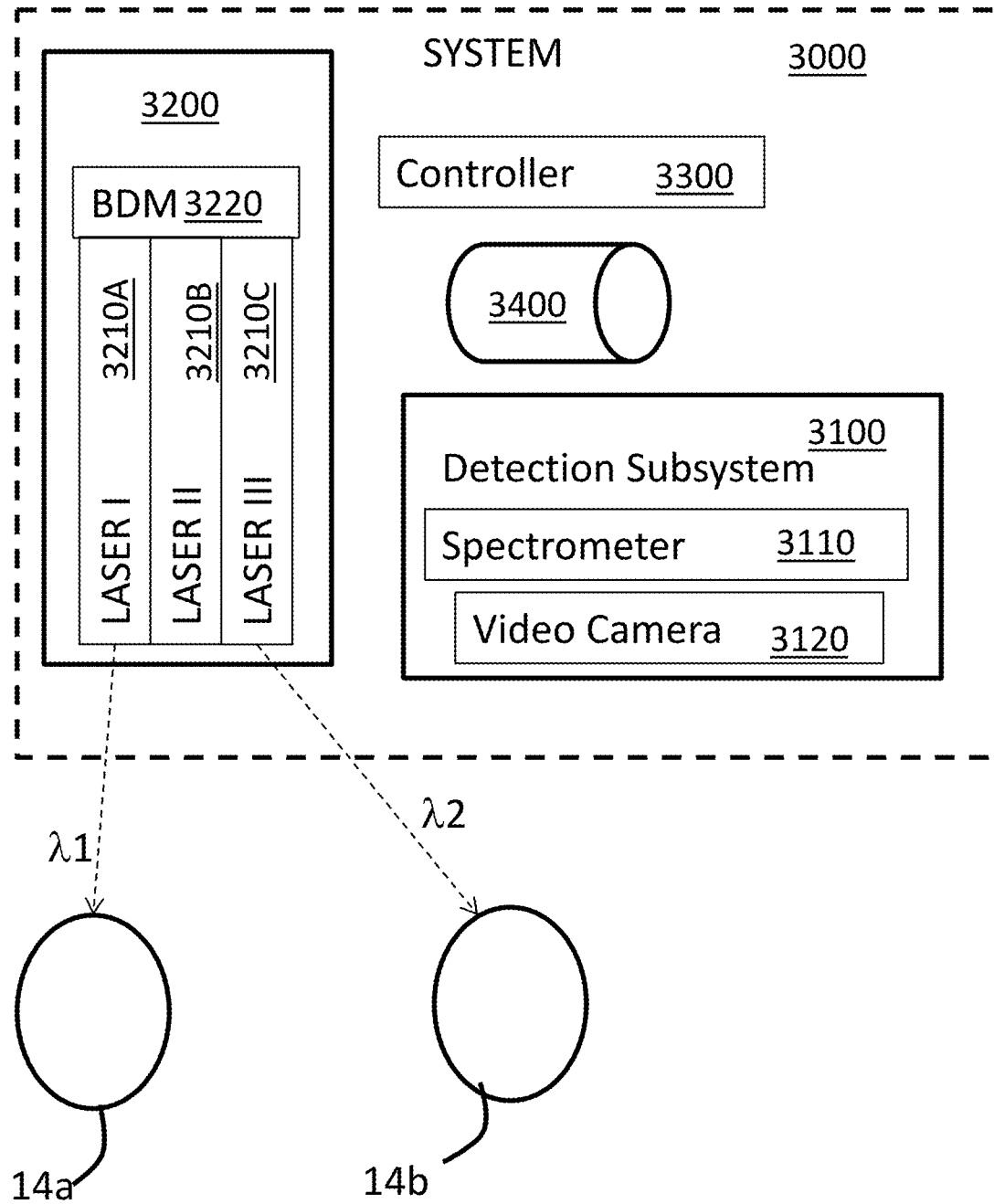
FIG. 5 shows a system for outputting of light towards objects, according to some embodiments, which includes multiple laser devices, each configured to output light in a different wavelength or wavelength band, for outputting of light in selectable different wavelengths and/or wavelength bands in a selectable manner.

Reference is now made to FIG. 5, schematically illustrating a system 3000 for controlling output of laser light towards objects, according to some embodiments. This system 3000 includes:

A detection subsystem 3100 configured to detect one or more object characteristics for one or more different given objects at any given time, using one or more detection devices and/or techniques, such as one or more of: the optical measuring technique, the object material detection technique, and/or the visual object identity based technique, using the required devices and/or data processing program(s) associated with each technique;

A light source subsystem 3200 including, for example, multiple laser devices such as laser I 3210A, laser II 3210B and laser III 3210C each configured to output spatially coherent laser beam of a different wavelength or a different narrow wavelength band, where each laser device may be associated with its own respective BDM or with a single central BDM such as central BDM 3220, configured for mechanically and adjustably directing the output laser beam from each laser device 3210A/3210B/3210C towards objects, e.g. according to an estimated and/or measured object location at a given time; and A controller 3300 for controlling operations of the light source subsystem 3200 and for receiving and analyzing data from the detection subsystem 3100 and/or from the light source subsystem 3200.

The BDM 3220 may include, for example, one or more mechanical mechanisms able to mechanically move each of the laser devices 3210A-3210C in any one or more of the three orthogonal spatial directions for aiming the output beam thereof towards the object, depending on object location. The BDM 3220 may also include one or more optical elements and/or devices for focusing the output light, maintaining beam coherency over distance and/or the like.

According to some embodiments, the detection subsystem 3100 may include one or more detection devices such as a spectrometer 3110 and a video camera 3120 for detection and identification of objects and object characteristics thereof, such as objects 14a and 14b. The object characteristics including at least the absorption wavelength(s) of each of the objects 14a and 14b may be detected in RT or near RT, e.g. by using RT image analysis of the video data for detecting the identity of each object and retrieving associated object characteristics e.g. from a designated DB 3400 and/or by actively measuring at least some of the object characteristics of each of the objects 14a and 14b (for example using one or more interferometers and/or spectrometers such as spectrometer 3110).

Once the object characteristics are detected, the controller 3300 may determine the one or more operational parameters' values for each of the objects 14a/14b, based on their respective object characteristics, e.g. using one of more calculation programs and/or by retrieving operation control protocols based on each object's characteristics and/or identity.

Once all values of all operational parameters are set for each object 14a and 14b, the controller 3300 operates the one or more laser devices 3210A-3210C according to the calculated and/or selected values of operational parameters, e.g. by selecting the appropriate one or more lasers from the laser devices 3210A-3210C for outputting and direction light in one or more output light wavelengths corresponding to the absorption wavelength(s) of each object 14a/14b (e.g. selecting laser device I 3210A outputting a beam in wavelength λ1 for object 14a that corresponds to the absorption wavelength of the object 14a and selecting laser device III 3210C outputting a beam in wavelength λ2 for object 14b that corresponds to the absorption wavelength of object 14b). The output light power and direction required for each object 14a/14b may also be based on their absorption wavelength, motion and/or distance object characteristics etc.

According to some embodiments, all objects such as object 14a and 14b may be simultaneously irradiated by the one or more light sources laser devices 3210A-3210B or one at a time in a sequential manner, depending on various object characteristics and/or other conditions. For example, if more than one of the objects requires using the same light source (e.g. if more than one object has the same absorption wavelength(s) requiring using the same light source) then each object will be irradiated separately one after the other. If each object requires a different light source a simultaneous irradiation may be carried out where each light source is directed towards a different object.

Figure 6:
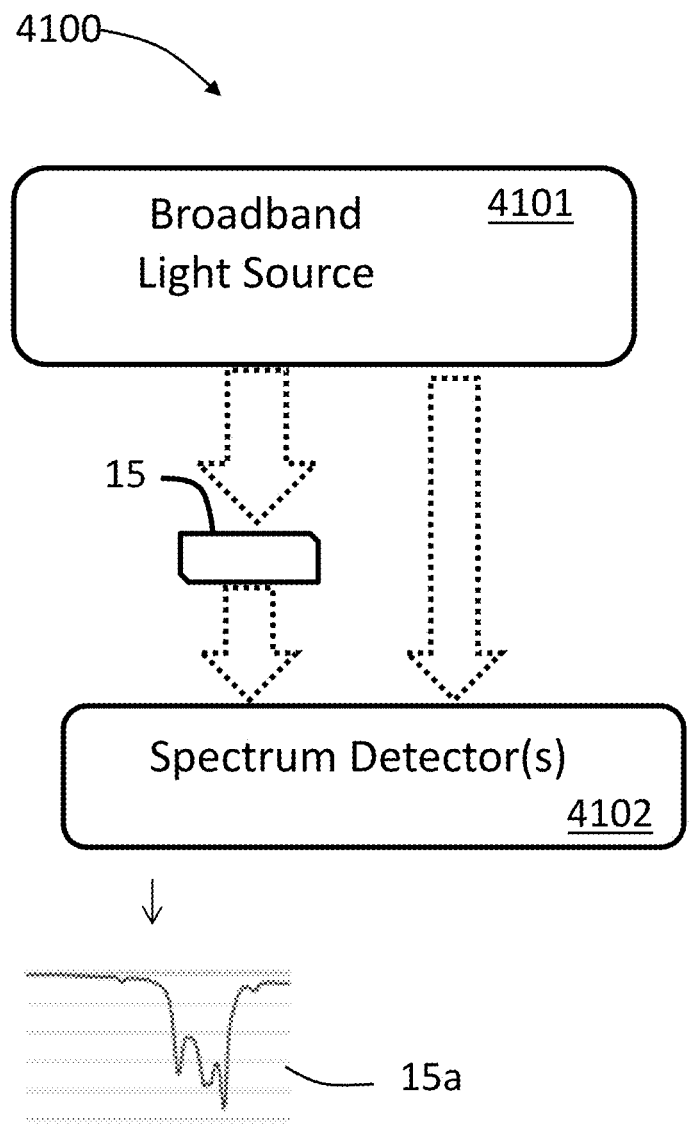
FIG. 6 shows a detection subsystem for a system for outputting light towards objects, where the detection of values of object characteristics, for each object is based on optical spectrometry, according to some embodiments.

Reference is now made to FIG. 6 showing a detection subsystem 4100 using a spectrometry-based object characteristics detection, according to some embodiments. This detection subsystem 4100 may include a broadband light source 4101 and one or more spectrum detectors 4102. The light outputted by the broadband light source 4101 is passed through an object 15 and may also be directed directly to the one or more spectrum detectors 4102 as a reference light. The optical spectrum 15a of the respective object 15 is detected and the one or more peaks indicative of the best absorbed wavelength lines are considered the one or more object's 15 absorption wavelengths. This information, including the absorption wavelength(s) of the object may then be used for determining output light source(s) operational parameters values.

Other detecting devices such as one or more cameras and/or 3D sensors may be used by the detection subsystem 4100 for detecting other characteristics of the object 15 such as the object's 15 location, motion characteristics and the like for determining/calculating other operational parameters values such as output power, light directing parameters and the like.

Figure 7A:
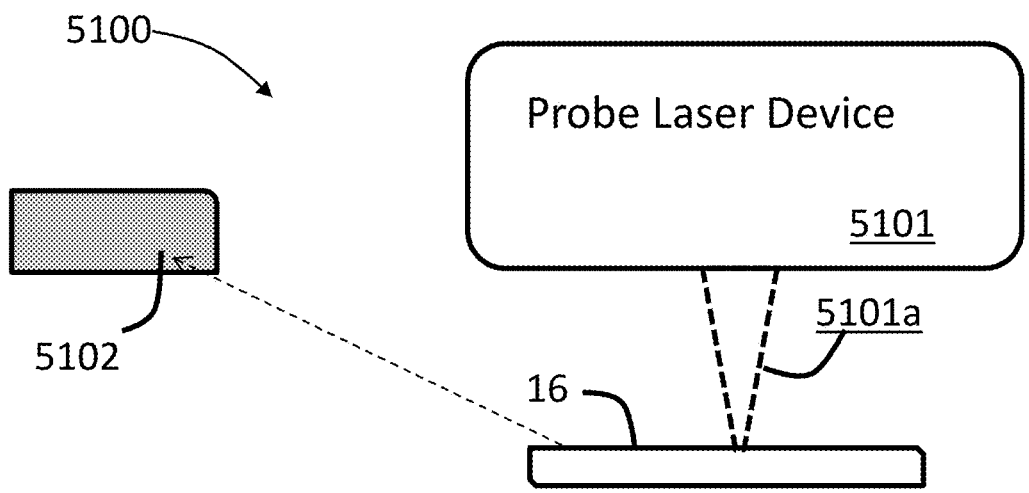
FIG. 7A shows a Raman spectrometer used for object characteristics values detection, according to some embodiments.
Figure 7B:
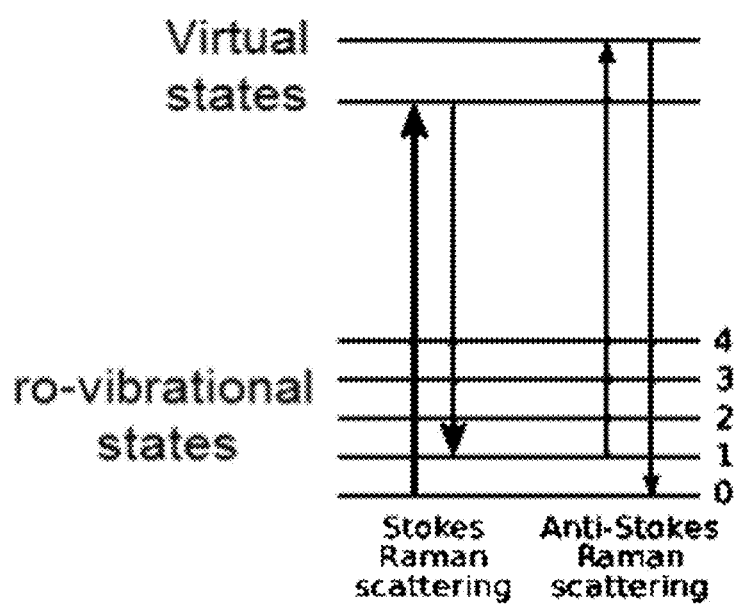
FIG. 7B shows a diagram illustrating possible energy states of a Raman spectrometer: strokes and anti-strokes.

Reference is now made to FIG. 7A showing an optional detection subsystem using a Raman Spectrometer 5100 that is based on Raman scattering, according to some embodiments. Raman spectroscopy is a method for detecting vibrational and/or rotational energetic patterns of a compound/object based on light scattered therefrom. The Raman spectrometer 5100 includes a probe laser device 5101 configured for outputting a focused laser beam 5101a (e.g. by using one or more focusing lenses) of a known frequency f1, towards the respective object 16, and at least one detector 5102 for detection of light scattered from the object's 16 surface. The light scattered from the object 16 will shift from the original output light frequency f1. And the shift rate may correspond to one or more object characteristics including at least the compound from which the object 16 is made. The light scattered by the object 16 may be shifted from its original frequency f1 by the exact amount of energy of an excited vibrational mode of the compound from which the object or at least its surface is made, and a spectrum analyzer detector 5102 may be configured to detect that shift. The outcome of such a measurement (herein "detection information") may be the rotational-vibrational spectrum of the object's 16 compound. This detection information may be further analyzed at the controller of the system and/or at a processing unit of the detection subsystem (not shown) for detecting the one or more absorption wavelengths associated with the detected compound and/or the detected spectrum. FIG. 7B shows a diagram illustrating possible energy states: strokes and anti-strokes. In the strokes state, some of the energy of the irradiated light (i.e. focused laser beam 5101a) was absorbed by the object causing excitation in the atomic level such that the scattered light will therefore show a frequency shift corresponding to an energy loss. In the anti-strokes state no excitation occurs and the material optionally loses energy and therefore, the reflected light may show frequency shift corresponding to energy gain or nor frequency shift.

Figure 8A:
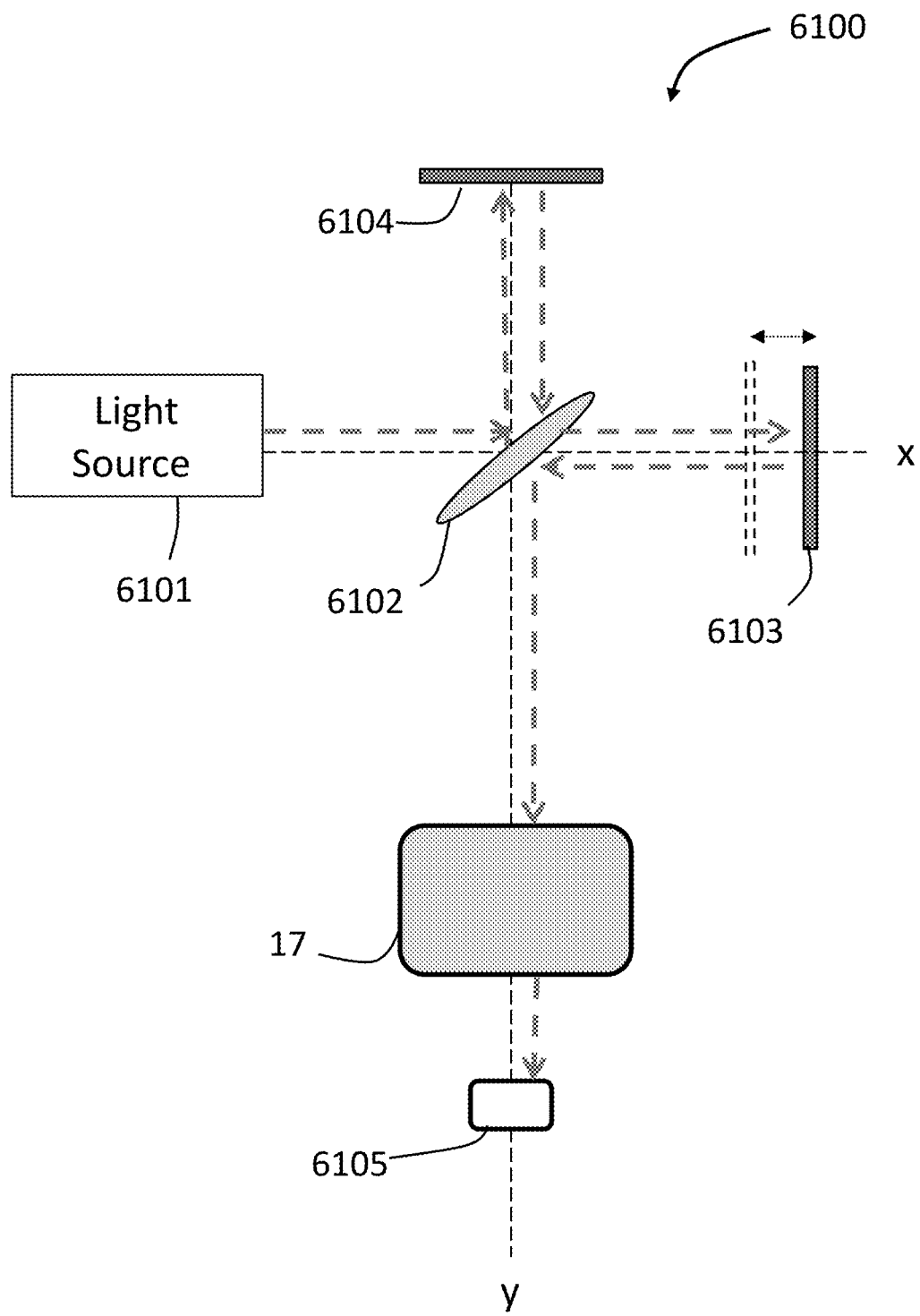
FIG. 8A shows a schematic illustration of a detection subsystem including a Michelson interferometry based light analyzer, namely, a fringes counter wavelength meter and Fourier Transform infrared (FTIR) interferometer that may be used for detection of object characteristics, according to some embodiments.
Figure 8B:
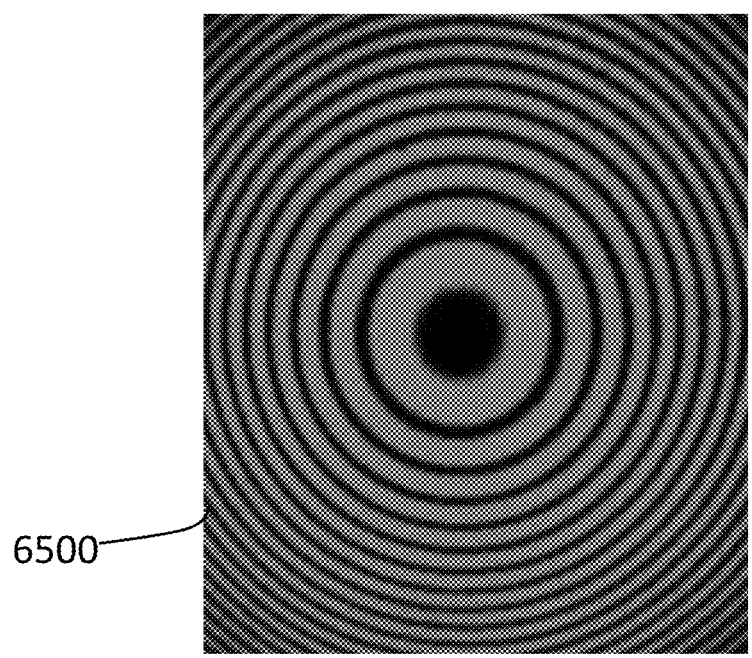
FIG. 8B shows fringes interference pattern that may be formed by using the Michelson interferometry-based detection subsystem, shown in FIG. 8A.

FIG. 8A shows an interferometry-based detection subsystem 6100, deploying a Michelson interferometer, for analyzing the scattered light coming from an object 17 under investigation. A scanning-mirror may be used to generate information from the interference of two beams that originate from the same light source 6101. The beams entering the system are optically split between a fixed path and a path that is continuously changing in length (e.g. by using a beam splitter 6102). Both beams are reflected and recombined to produce an interference pattern such as interference pattern 6500 as shown in FIG. 8B, that varies over time due to the changing phase relationship between the beams. Interference pattern may be generated and simultaneously compared to the interference pattern created by a built-in narrow band light source (He-Ne for example). By comparing the number of interference fringes in the pattern 6500 generated during the interferometer's scan absorption wavelength(s) of the object 17 under test can be determined.

According to some embodiments, the detection subsystem 6100 may include a Fourier Transform infrared (FTIR) wide band spectrum analyzer for detection of object characteristics including absorption characteristics of an object 17, e.g. using the interferometry-based detection subsystem 6100 layout. The FTIR interferometry-based detection subsystem 6100 may be based on the Michaelson interferometry principles. The FTIR interferometer of the detection subsystem 6100 may include: a laser light source such as a broad band laser device 6101 outputting laser beam in the infrared (IR) wavelength-band along an axis "x"; two mirrors: a stationary mirror 6104 located such as to reflect light in a direction "y" that is perpendicular to the direction "x" of the laser outputted light, and a movable mirror 6103 located such as to reflect light opposite to the output light and along the "x" axis; at least one detector 6105 located opposite to the stationary mirror 6104; and a beam splitter 6102 located such that the light outputted from the laser device 6101 can be split and directed to both mirrors 6103 and 6104.

The FTIR based detection subsystem 6100 is configured for emitting light in the broadband IR using the laser device 6101 along the "x" axis opposite the movable mirror 6103, where the object 17 is positioned at the interferogram leg such that the light emitted by the light source laser device 6101 is passed through the beam splitter 6102 and directed to both mirrors 6103 and 6104 and from there towards the object 17. While acquiring detection spectral measurements (e.g. by using the detector 6105), the movable mirror 6103 is moved back and forth creating a changing interference pattern on the object 17 and the detector 6105 positioned behind the object 17 detects the light right after the object 17. Since the interference pattern for each wavelength is periodically changed, so is the absorption in the object 17 depending on its respective material(s) composition. The time dependent spectrum measured by the detector 6105 (i.e. the interferogram) is then mathematically processed (e.g. using one or more analysis programs that analyze the data outputted by the detector 6105) to transform the result to a frequency/wavelength-based spectrum of the respective object 17 indicative of the object's 17 specific one or more absorption wavelengths (frequencies).

Other types of techniques and devices may be used for detecting absorption wavelengths of objects by the detection subsystem, such as other types of interferometers and/or spectrometers and/or optical detectors, cameras and/or sensors.

Figure 9:
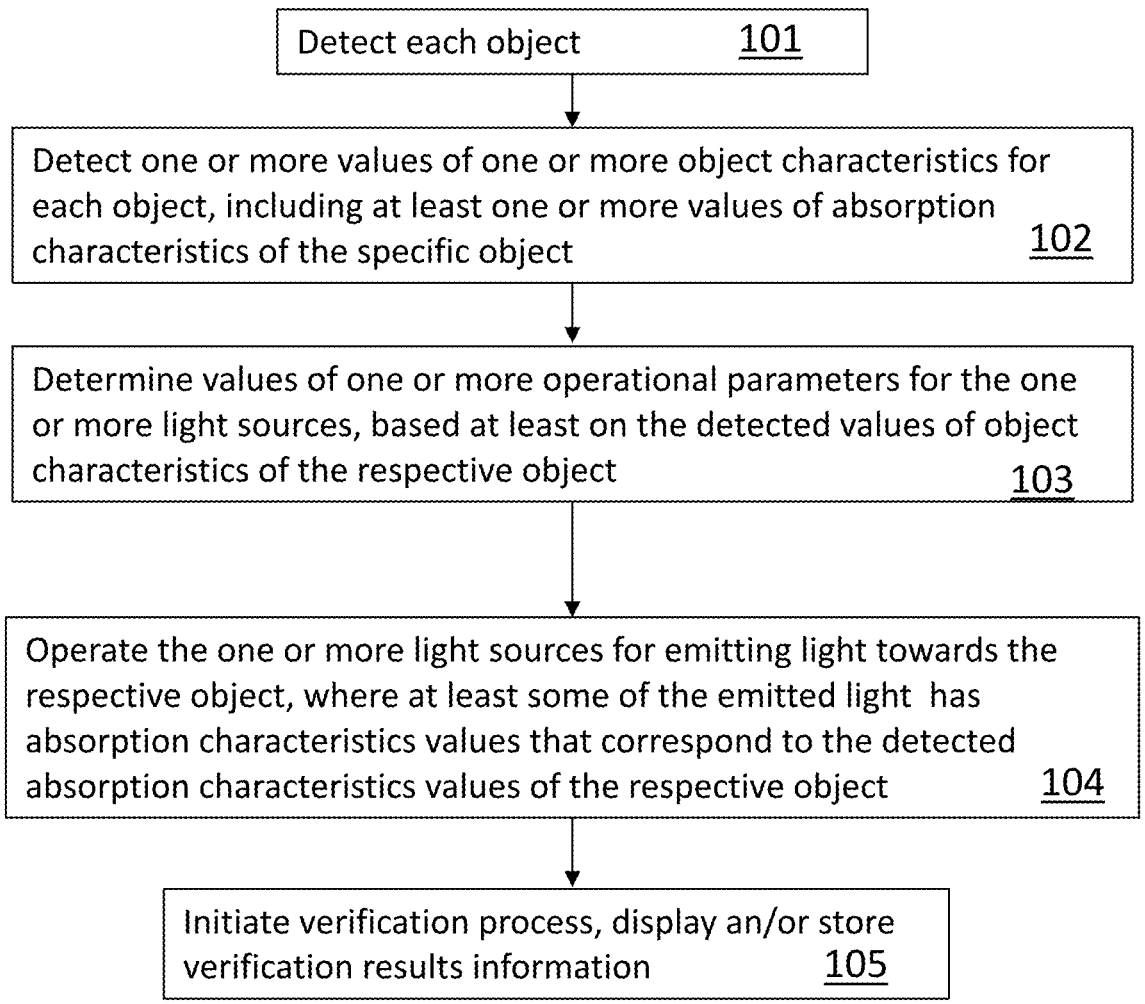
FIG. 9 shows a flowchart illustrating a process for outputting light towards objects, according to some embodiments.

Reference is now made to FIG. 9 showing a flowchart for a process of outputting light towards the detected objects, for a light emission event, according to some embodiments.

According to some embodiments, as shown in FIG. 9, once an object is detected 101, one or more values of one or more object characteristics of the respective object are detected 102 e.g. by measuring thereof and/or by identification of the object and thereby detecting (identifying) its object characteristics' values. The object characteristics include at least electromagnetic absorption characteristics such as the object's optical absorption wavelength(s), i.e. energy wavelength(s) that the respective object best absorbs.

According to some embodiments, values of other object characteristics may be detected such as the location of the object relative to one or more reference points (such as relative light source(s) location, motion characteristics such as object's velocity and/or acceleration rate, chemical composition of the object, density of the object, topography of the object (e.g. surface area topography), type of the object, identity of the object, color of the object, chemical state of the object (solid, gas, gel, liquid, viscosity level, etc.) and the like.

According to some embodiments some of the values of object characteristics may be measured such as the object's absorption characteristics while other may be detected by acquiring visual data or imagery (e.g. video data) of the object and optionally also a ROI thereof and analyzing the acquired data for calculating and/or estimating other object characteristics' values of the object, such as the color, location and/or motion of the object and the like.

To detect the one or more values of object characteristics for each object, which may be previously unknown, one or more detection devices and/or subsystems may be used such as, for example, at least one of: video camera, 3D sensor, charged coupled device (CCD) camera, still camera, interferometer such as FTIR interferometer, spectrometer such as Raman spectrometer, laser-induced breakdown spectrometer, optical detector, environmental detector such as a thermometer, etc.

According to some embodiments, once the one or more values of object characteristics are detected 102, values of one or more operational parameters may be determined 103, e.g. using one or more programs and/or algorithms configured to calculate value(s) of operational parameters for each respective object, based at least on the one or more values of object characteristics of the respective object. The operational parameters values determine how to operate one or more light sources for emitting light towards the respective object. For example, the operational parameters may determine selection of one or more of: output light power/intensity/amplitude, output light electromagnetic flux, output light wavelength(s)/frequency(ies) and/or band(s), light direction, light emission duration; output light focusing level, output light spatial coherence level, output light emission frequency; and the like.

At least one of the operational parameters values may be determined 103 also based on external system requirements such as according to desired effect to be caused to the object, by the outputting of light towards the object.

According to some embodiments, once an identity of the object is detected and other characteristics values thereof such as location, motion etc., and given a specific desired effect (e.g. perforating, cutting, welding etc.), one or more designated system light sources may be operated for emitting (outputting) light towards the object for causing the desired effect thereto 104. The operation of the one or more light sources 104 may be carried out according to the determined values of operational parameters e.g. by selecting output light wavelength(s) that correspond (i.e. fit, equal or closest) to the absorption wavelength(s) of the respective object, select output light power and emission duration according to the desired effect, object location, and/or the absorption wavelength(s) and adjust light emission (output) direction according to object location etc.

According to some embodiments, to control operation of the one or more light sources each of the light sources may be controllable e.g. by using a central controller operatively associated therewith.

According to some embodiments, once the one or more light sources have been operated for emission of light towards the respective object 104, a verification process may be initiated 105, for example, for checking how the actual effect caused to the respective object by the emission of the light. The verification may be carried out using one or more verification devices such as one or more detectors, cameras etc. configured to measure one or more effect parameters such as temperature of the object, size and/or shape of the object post emission and the like.

Some or all of the information associated with each emission event, for each specific object may be stored and optionally analyzed as a learning process for improving future emission events. For example, all detected data (e.g. all values of the object characteristics and/or identity of the object), all selected and determined operational parameters values and all verification information of each emission event for each object may be stored and then analyzed, e.g. for detection and correction of system errors such as emission direction adjustments errors and/or power selection errors and the like, that may allow reprogramming some of the programs used for the detection of values of object characteristics, determination of operational parameters values and the like for correcting these detected errors.

EXAMPLES

Example 1 is a system for controlling outputting of light towards objects, comprising: a detection subsystem configured to detect, for at least one object, one or more values of object characteristics, the object characteristics comprising, at least, electromagnetic absorption characteristics, wherein detection of object characteristics values is performed in a passive manner and/or active manner by outputting first output light towards the object such that the object remains structurally intact (e.g., at least on a macroscopic scale); a light source subsystem comprising at least one light source configured to output second output light and directing the second output light towards an object; and a controller configured to control, based on the detected object characteristics values, at least one operational parameter value of the at least one light source such that at least some of the second output light that is directed towards the object has electromagnetic characteristics that correspond to the detected values of the electromagnetic absorption characteristics of the object, in order to structurally change at least part of the respective object (e.g., on a macroscopic scale). The first output light may have lower power and/or flux than the second output light.

In example 2, the subject matter of example 1 includes, wherein the electromagnetic absorption characteristics comprise one or more optical absorption wavelengths and/or wavelength bands best absorbed by the object.

In example 3, the subject matter of example 2 includes, wherein the light source subsystem is configured to selectively output light in multiple wavelengths and/or wavelength bands.

In example 4, the subject matter of any one or more of examples 1 to 3 includes, wherein the light source subsystem comprises at least one of: a tunable laser device; multiple laser devices each of the multiple laser devices being configured to output light of a different single wavelength or a single wavelength band.

In example 5, the subject matter of any one or more of examples 1 to 4, wherein the at least one operational parameter value of the light source subsystem comprises one or more of the following: output light wavelength; output light wavelength band; output light amplitude, intensity or power; output light electromagnetic flux, output light focusing level; output light spatial coherence level; output light emission duration; output light emission frequency; and/or output light phase.

In example 6, the subject matter of any one or more of examples 1 to 5 includes, wherein the detection subsystem is configured to detect one or more values of object characteristics by: (i) measuring optical electromagnetic absorption characteristics of the object, using one or more optical detectors; (ii) detecting one or more materials from which the object or part thereof is made of and identify the electromagnetic absorption characteristics, according to the detected one or more materials; and/or (iii) acquiring and analyzing visual data of the object for determining identity thereof and detecting its respective electromagnetic absorption characteristics, according to the determined identity of the respective object.

In example 7, the subject matter of example 6 includes, wherein the optical detection of the values of the object characteristics is carried out in an active manner, by emitting light towards the object and detecting changes between light reflected from the object and the emitted light, wherein the output light directed towards the respective object for structurally changing at least part thereof is of higher electromagnetic flux than the electromagnetic flux of the light emitted towards the object for detection of its object characteristics values.

In example 8, the subject matter of example 7 includes, wherein the detection subsystem comprises one or more of:
an optical spectrometer;
an interferometer;
a Raman spectrometer;
a Fabry-Perot spectrometer;
a Fourier Transform Infrared (FTIR) based interferometer;
a laser-induced breakdown spectrometer;
an optical detector;
interferometry-based wavelength meter.

In example 9, the subject matter of example 6 includes, wherein the optical measuring comprises passive detection of light reflected from the object for detecting of optical one or more physical values of object characteristics.

In example 10, the subject matter of any one or more of examples 1 to 9 includes, wherein the object characteristics further comprise one or more of:

object relative position and/or orientation relative to at least one reference position;

distance between the object and the at least one light source; environmental parameter values, in an area in which the object and/or the at least one light source are located;

object material composition;
object size;
object weight;
object material density;
object surface area;
object shape;
object velocity; and/or
object acceleration.

In example 11, the subject matter of any one or more of examples 1 to 10 include, wherein the controller is further configured to control one or more of the at least one operational parameter value, according to at least one desired effect to be caused to the object that structurally changes at least part of the respective object.

In example 12, the subject matter of example 11, wherein the desired effect comprises one or more of:

cutting of the object or part thereof;
perforating of the object or part thereof;
melting of the object or part thereof;
heating of the object or part thereof;
deforming of the object or part thereof;
causing damage to the object or part thereof;
welding of the object or part thereof to another object;
reduce or destroy lift force acting on the object, if airborne.

In example 13, the subject matter of any one or more of examples 1 to 12, wherein the system further includes a verification and learning subsystem, configured to measure an actual effect caused to the object by the output light directed towards the object and to store and/or display verification information.

In example 14, the subject matter of any one or more of examples 1 to 13 includes, wherein the light source subsystem and the controller are configured to simultaneously output and direct light from the one or more light sources towards multiple different objects, and wherein the controller is configured to adjust the at least one operational parameter value of the at least one light source, according to the values of object characteristics of each object.

In example 15, the subject matter of example 14 includes, wherein the detection subsystem is configured to detect in real time (RT) or near RT time multiple objects and values of object characteristics thereof and the controller is configured to determine values of operational parameters in RT or near RT in respect to the detection time.

In example 16, the subject matter of any one or more of examples 1 to 15 includes, wherein the detection subsystem is further configured to detect location of each object, and wherein the light source subsystem further comprises at least one beam directing mechanism (BDM) for directing light outputted by each of the at least one light source towards the object.

In example 17, the subject matter of example 16 includes, wherein the at least one BDM is embedded in the at least one light source and/or external thereto and operatively associated therewith.

Example 18 is a method for controlling outputting of light towards objects, comprising: for each object, detecting one or more values of object characteristics of the object, the object characteristics comprising at least electromagnetic absorption characteristics of the object, wherein detection of object characteristics values is performed in a passive manner and/or active manner by outputting first output light towards the object such that the object remains structurally intact (e.g., on a macroscopic scale); and controlling output of second output light from at least one light source for emission and directing thereof towards the object, at least by selectively controlling one or more operational parameter values of the at least one light source, such that at least some of the second output light that is directed towards the object has electromagnetic characteristics that correspond to the detected values of the electromagnetic absorption characteristics of the object, in order to structurally change, ,e.g., on a macroscopic scale, at least part of the respective object. The first output light may have lower power and/or flux than the second output light.

In example 19, the subject matter of example 18 includes, wherein the electromagnetic absorption characteristics comprise one or more optical absorption wavelengths and/or wavelength bands best absorbed by the object.

In example 20, the subject matter of any one or more of examples 18 to 19 includes, wherein the one or more object characteristics of the object further comprise at least one of:

object location;
object material composition;
object size;
object weight;
object material density;
object topography;
object shape;
object velocity;
object acceleration rate.

In example 21, the subject matter of any one or more of examples 19 to 20 includes, wherein the light source comprises at least one tunable laser device having multiple available output optical wavelengths, wherein the controlling of the output of light from the at least one light source comprises selecting one or more of the multiple available output optical wavelengths that correspond to the detected optical absorption wavelengths and/or wavelength bands best absorbed by the object.

In example 22, the subject matter of any one or more of examples 19 to 21 includes, wherein the light source comprises multiple laser devices, each configured to output light of a single and different wavelength or a single different wavelength band, wherein the controlling of the output of light from the at least one light source comprises selecting one or more of the multiple laser devices that are configured to output light in one or more wavelengths and/or wavelength bands that correspond to the detected optical absorption wavelengths and/or wavelength bands best absorbed by the object.

In example 23, the subject matter of any one or more of examples 18 to 22 includes, wherein the at least one operational parameter value comprises one or more of the following: output light wavelength; output light amplitude, intensity or power; output light electromagnetic flux, output light focusing level; and/or output light phase.

In example 24, the subject matter of any one or more of examples 18 to 23 includes, wherein the detection of the one or more object characteristics is carried out by using at least one of: measuring optical electromagnetic absorption characteristics of the object; detecting one or more materials from which the object or part thereof is made of and identify the electromagnetic absorption characteristics, according to the detected one or more materials; acquiring and analyzing visual data of the object for determining identity thereof and detecting its respective electromagnetic absorption characteristics, according to the identity of the respective object.

In example 25, the subject matter of example 24, wherein the detection of the object characteristics values is carried out in an active manner, by emitting light towards the object and detecting light reflected from the object for detecting influence of the emitted light by detecting changes between the reflected and emitted light, wherein the light directed towards the respective object for structurally changing at least part thereof is of higher electromagnetic flux than the electromagnetic flux of the light emitted towards the object for detection of its respective object characteristics values.

In example 26, the subject matter of any one or more of examples 24 to 25 includes, wherein the measuring of the optical electromagnetic absorption characteristics is carried out by using one or more of the following techniques: optical spectrometry; optical interferometry; Raman spectrometry; Fabry-Perot spectrometry; Fourier Transform Infrared (FTIR) based interferometry; laser-induced breakdown spectrometry.

In example 27, the subject matter of example 26 includes, wherein the measuring of the optical electromagnetic absorption characteristics is carried out in a passive manner, by detecting light reflected from the object.

In example 28, the subject matter of any one or more of examples 18 to 27 includes, wherein the controlling of one or more of the at least one operational parameter value of the at least one light source is further carried out according to at least one desired effect to cause to the object that structurally changes at least part of the respective object.

In example 29, the subject matter of example 28 includes, wherein the desired effect comprises one or more of:
  cutting of the object or part thereof; perforating of the object or part thereof;
  melting of the object or part thereof;
  heating of the object or part thereof;
  deforming of the object or part thereof;
  causing damage to the object or part thereof;
  welding of the object or part thereof to another object;
  reduce or destroy lift force acting on the object, if airborne.

In example 30, the subject matter of any one or more of examples 18 to 29, wherein the method may further comprise: verifying actual effect caused to the object by the output of light towards the object resulting in a verification information indicative thereof; and displaying and/or storing of the verification information.

In example 31, the subject matter of example 30 includes, wherein the verification of the resulting effect over the object comprises at least one of: measuring the resulting effect on the object caused, by using at least one measuring device configured to measure at least one effect parameter indicative of the effect caused by the output of light towards the object; receiving user feedback indicative of the effect caused to the object by the output of the light thereto.

In example 32, the subject matter of any one or more of examples 30 to 31, wherein the method may further comprise: accumulating verification information for multiple objects; and operating at least one learning program configured to analyze the accumulated verification information over time for errors identification and correction.

In example 33, the subject matter of any one or more of examples 18 to 32, wherein the method may further include simultaneously outputting and directing of the light from the at least one light source towards multiple different objects, by adjusting the value of the at least one operational parameter of each light source, according to the object characteristics of each object.

In example 34, the subject matter of any one or more of examples 18 to 33, wherein the method may further comprise detecting in real time (RT) or near RT time one or more moving objects and values of object characteristics thereof and RT and/or near RT controlling of the output of light towards the one or more moving objects.

Example 35 is a system for controlling outputting of light towards objects, comprising: a detection subsystem configured to detect, for each object, one or more values of object characteristics of each object for causing an effect thereto, the object characteristics values comprising at least: one or more optical absorption wavelengths and/or wavelength bands best absorbed by the respective object, wherein the detection of object characteristics values is performed in an active manner by outputting first output light towards the object and/or in a passive manner such that the object remains structurally intact, e.g., on a macroscopic scale; a light source subsystem comprising one or more light sources configured to selectively generate output light; and a controller, operatively associated with the detection subsystem and with the light source subsystem, the controller being configured to control, based on the detected object characteristics values, the outputting of second output light from one or more light sources and to direct the second output light towards the object, at least by selecting one or more optical output light wavelengths and/or wavelength bands that correspond to the one or more detected values of optical absorption wavelengths and/or wavelength bands best absorbed by the object, in order to structurally change, e.g., on a macroscopic scale, at least part of the respective object. The first output light may have lower power and/or flux than the second output light.

Example 36 is a method for controlling outputting of light towards objects, comprising: for each object, detecting one or more values of object characteristics of the object, the object characteristics comprising at least one or more optical absorption wavelengths and/or wavelength bands of the object, wherein the detection of object characteristics values is performed in an active manner by outputting first output light towards the object and/or in a passive manner such that the object remains structurally intact, e.g., on macroscopic scale; and for each object, controlling, based on the detected object characteristics values, output of second output light from at least one light source and directing thereof towards the object, at least by selecting one or more optical output light wavelengths and/or wavelength bands that correspond to the one or more detected values of optical absorption wavelengths and/or wavelength bands of the object, in order to structurally change, e.g., on a macroscopic scale, at least part of the respective object. The first output light may have lower power and/or flux than the second output light.

While the invention has been described with respect to a limited number of embodiments, these should not be construed as limitations on the scope of the invention, but rather as exemplifications of some of the embodiments.

Any digital computer system, unit, device, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein.

Additionally or alternatively, the methods and/or processes disclosed herein may be at least partially implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

A module and/or unit may comprise a machine or machines executable instructions. A module and/or unit may be embodied by a circuit or a controller programmed to cause the system to implement the method, process and/or operation as disclosed herein. For example, a module may be implemented as a hardware circuit comprising, e.g., custom very large-scale integration (VLSI) circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms "substantially", "about" and/or "close" with respect to a magnitude or a numerical value may imply to be within an inclusive range of −10% to +10% of the respective magnitude or value.

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may, where applicable, also refer to "heuristically determining".

It should be understood that where the claims or specification refer to "a" or "an" element and/or feature, such reference is not to be construed as there being only one of those elements. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made. Further, the use of the expression "and/or" may be used interchangeably with the expressions "at least one of the following", "any one of the following" or "one or more of the following", followed by a listing of the various options.

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the terms "in some embodiments", "according to some embodiments", "according to some embodiments of the invention", "for example", "e.g.", "for instance" and "optionally" may herein be used interchangeably.

The number of elements shown in the Figures should by no means be construed as limiting and is for illustrative purposes only.

It is noted that the terms "operable to" can encompass the meaning of the term "modified or configured to". In other words, a machine "operable to" perform a task can in some embodiments, embrace a mere capability (e.g., "modified") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

What is claimed is:

1. A system for controlling light output towards moving objects, the system comprising:
    at least one first light source configured to output a first output light towards at least one moving object;
    at least one laser light source configured to output laser light towards the at least one moving object;
    at least one controller configured to control the at least one first light source and the at least one laser light source; and
    at least one detector configured to detect the at least one moving object in a region-of-interest (ROI);
    wherein the at least one detector is configured to detect object characteristics of the at least one moving object by receiving light reflected from the at least one moving object, the object characteristics including an electromagnetic absorption characteristic;
    wherein the at least one controller is configured to:
    control the at least one first light source to output first output light towards the detected at least one moving object;
    set one or more operational parameter values of the at least one laser light source based on the object characteristics detected with respect to the at least one moving object, and
    control the operation of the at least one laser light source in accordance with the one or more operational parameter values to output the laser light that is directed towards the at least one moving object, the laser light having electromagnetic characteristics that correspond to the detected electromagnetic absorption characteristics of the at least one moving object, in order to structurally change, on a macroscopic scale, at least part of the at least one moving object.

2. The system of claim 1, wherein the electromagnetic absorption characteristics comprise one or more optical absorption wavelengths and/or wavelength bands best absorbed by the at least one moving object.

3. The system of claim 1, wherein the first output light has lower power than the laser light.

4. The system of claim 1, further comprising a light source subsystem that comprises at least one of: a tunable laser device; multiple laser devices each of the multiple laser devices being configured to output light of a different single wavelength or a single wavelength band.

5. The system of claim 1, wherein the at least one operational parameter value of the at least one laser light source comprises one or more of the following: output light wavelength; output light wavelength band; output light amplitude, intensity or power; output light electromagnetic flux, output light focusing level, output light spatial coherence level, output light emission duration, output light emission frequency, and/or output light phase.

6. The system of claim 1, wherein the at least one detector is configured to detect electromagnetic absorption characteristics of the at least one moving object characteristics by performing one or more of the following:
    measuring optical electromagnetic absorption characteristics of the at least one moving object;
    detecting one or more materials from which the at least one moving object thereof is made of and identify the electromagnetic absorption characteristics, according to the detected one or more materials;
    acquiring and analyzing visual data of the at least one moving object for determining identity thereof and detecting, for the at least one moving object, characteristics comprising at least electromagnetic absorption characteristics, according to the determined identity of the respective at least one moving object.

7. The system of claim 6, wherein the at least one detector is configured to detect the object characteristics by outputting first output light towards the at least one moving object and detecting changes between light reflected from the at least one moving object and the emitted first output light, wherein the laser light directed towards the respective at least one moving object for structurally changing at least part thereof is of higher electromagnetic flux than the electromagnetic flux of the first output light emitted towards the at least one moving object.

8. The system of claim 1, wherein the at least one controller is further configured to control one or more of the at least one operational parameter value, according to at least one desired effect to be caused to the at least one moving object that structurally changes at least part of the respective at least one moving object, wherein the at least one desired effect is selected from the group consisting of: cutting, perforating, melting, heating, deforming, causing damage, welding, reducing or destroying lift force of the object thereof.

9. The system of claim 1, further comprising a verification and learning subsystem configured to measure an actual effect caused to the at least one moving object by the output light directed towards the at least one moving object and to store and/or display verification information.

10. The system of claim 1, wherein the at least one controller is configured to cause simultaneous output and direct light from the at least one second laser light source towards multiple different moving objects, and wherein the at least one controller is configured to adjust the at least one operational parameter value of the at least one laser light source, according to the detected object characteristics of each moving object.

11. The system of claim 1, wherein the at least one detector is further configured to detect location of each moving object, and wherein the system further comprises at least one beam directing mechanism (BDM) including one or more mechanical mechanisms or one or more optical elements for directing light that is output by the at least one first light source, laser light source, or both, towards the at least one moving object.

12. The system of claim 1, wherein a distance between the at least one moving object and the at least one light source is at least 10 meters.

13. The system of claim 1, wherein the first light source and the laser light source are a same light source used for irradiating:
  a) for effecting of the object, and
  b) for the detection of the object characteristic.

* * * * *